Figure 1:
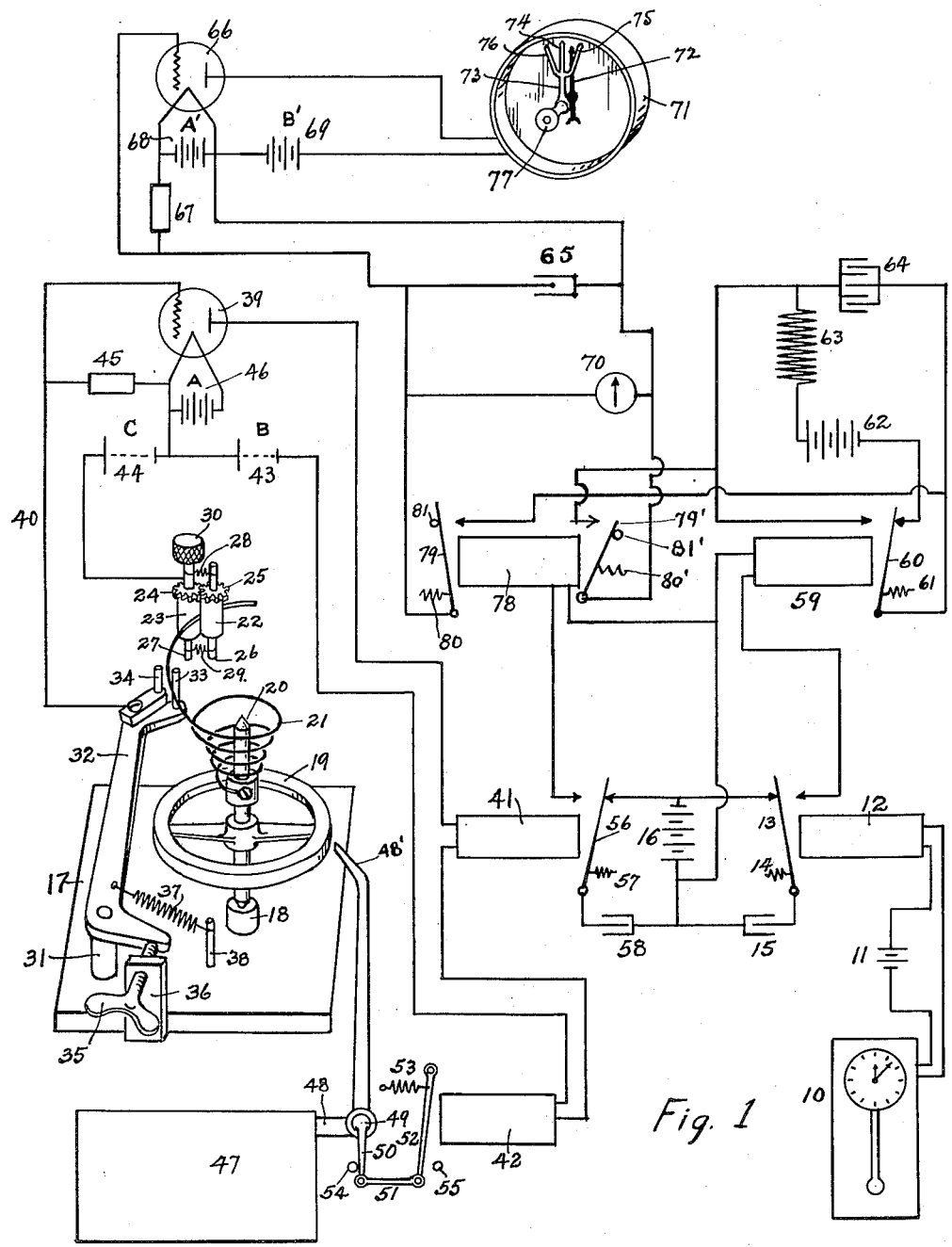

Nov. 5, 1935.   A. F. POOLE   2,019,769
APPARATUS FOR TIMING BALANCES
Filed Jan. 14, 1933   2 Sheets-Sheet 1

INVENTOR.
Arthur F. Poole.

Patented Nov. 5, 1935

2,019,769

UNITED STATES PATENT OFFICE 2,019,769

APPARATUS FOR TIMING BALANCES

Arthur F. Poole, Ithaca, N. Y.; Maryline B. Poole, administratrix of said Arthur F. Poole, deceased, assignor to Maryline B. Poole, Ithaca, N. Y.

Application January 14, 1933, Serial No. 651,829

5 Claims. (Cl. 175—368)

My invention is an improved apparatus for timing balances before these balances are assembled in the timepieces whose indications they govern. The general plan is first to translate the vibrations of the balance under test (hereinafter called "the $x$ balance") into a series of electric currents (hereinafter called "the $x$ currents") proportional to the frequency of the $x$ balance. A standard clock, or other source of time, furnishes a second series of currents (hereinafter called "the standard currents") of approximately the same frequency as the $x$ currents. When each standard current starts, it begins to charge a standard condenser from a suitable source of electromotive force, hence at any time after the beginning of said charge the potential of the condenser is a function of the elapsed time since charging began. When an $x$ current occurs a detector condenser is brought to the potential of the standard condenser by being momentarily connected therewith. The potential of the detector condenser is then measured; if it remains the same through successive currents, it indicates that the phase relation between the $x$ and standard currents is constant and that the balance is vibrating at the same rate as the standard. If the potential of the detector condenser increases it indicates that the balance is running slow, a decrease indicates that the $x$ balance is running fast. After an observation shows the $x$ balance not to be within the limits of accuracy desired, the hairspring is changed accordingly and a new test is started.

One of the objects of my invention is a method and apparatus to carry out the above described operations, a further object is an alternative circuit arrangement to carry out the above described tests and a still further object is an improved apparatus to keep the balance in vibration while being tested. Another object of my invention is a fixture having adjustable bearings in which the balance may be vibrated under its own hairspring, said fixture having a clip into which the spring may be clamped without deformation and in which the spring may be adjusted to alter the length of said spring while the balance is in vibration. A further object is the provision of a fixture above described with the addition of a device to translate the vibrations of the $x$ balance into a series of impulses whose frequency is proportional to the frequency of the balance.

The above, and other objects of my invention will be apparent to those skilled in the art from the following specification wherein, and in the claims thereof, they will be set forth.

Figure 2:
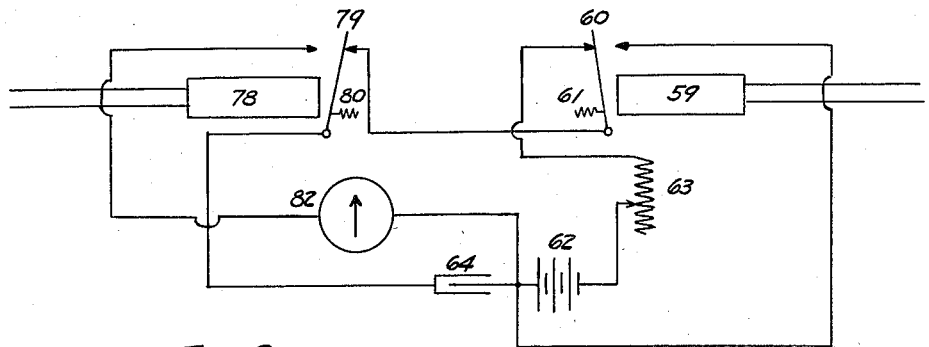

My invention may be best understood by reference to the figures of which Fig. 1 is a diagrammatic view of one circuit and a balance fixture to carry out my improved method and Fig. 2 is an alternative circuit arrangement.

The same reference numerals identify like parts in both figures.

Referring now to Fig. 1, 10 is a master clock having a contact to close a circuit including a battery 11 and a relay 12 twice a second, thus producing a series of standard currents to which the $x$ currents are compared. The period of two per second, or 120 per minute is used in the following description simply to fix one's ideas, any other period, corresponding to such other period of $x$ balances may be used. I have not shown the precise form of contact in the clock 10 since such contact forms no part of my present invention; there are many suitable contacts in the prior art, one is shown in my Patent 1,130,374 of 1919. The relay 12 has an armature 13 held by a spring 14 to a back contact and drawn to a front contact when the relay 12 is energized by the contact of the clock 10. The armature 13 when held to its back contact charges a condenser 15 to the potential of a batterey 16, and, when drawn to its front contact, discharges the condenser 15 through a relay 59 for a purpose afterwards to be described.

A fixture 17 is provided with a stud 18 in which vibrates an $x$ balance 19 on a shaft 20 in a period determined by a hairspring 21, having inner end attached to the shaft 20 and its outer end held between two rollers 22 and 23 which clamp said spring without distorting it as is done when a hairspring is pinned in the customary hairspring stud of a watch or clock. This clamping the spring without deforming it, permits said spring to be shortened or lengthened as may be required. The rollers 22 and 23 are geared together by two gears 24 and 25 on the roller shafts 26 and 27 turning loosely in the framework of the fixture 17 and held in frictional engagement with the spring 21 by springs 28 and 29. A handle 30 on the roller 23 affords a convenient way of altering the effective length of the spring 21 when desired. A stud 31 in the fixture 17 has turning on it an arm 32 which carries regulator pins 33 and 34, the pin 34 being insulated from said arm 32. Referred to the balance staff 20, the regulator pins 33 and 34 are the same angular distance from the rollers 22 and 23 as the regulator pins of the clock from the hairspring stud when the clock regulator is in the center of its travel, thus insuring the $x$ balance being timed under the same conditions as it afterwards has when put in the clock. The radial distance of the regulator pins 33 and 34 from the shaft 20 may be adjusted by a screw 35 in a bracket 36 on the fixture 17, the arm 32 being held by a spring 37 attached to a pin 38 in said fixture against the screw 35.

As the balance 19 vibrates the spring 21 will play between the regulator pins 33 and 34. I have taken advantage of this fact to translate the vibrations of the balance into a series of electric currents. Reference to the drawings will show a triode 39 whose grid is connected to the insulated pin 34 by a conductor 40. The plate circuit of the triode 39 may be traced through a relay 41, an impulse magnet 42 and a B battery 43 to the filament of the triode. A C battery 44 throws a negative bias on the grid and is connected to the frame of the fixture 17. When the hairspring 21 is in contact with the pin 34 a negative bias is on the grid and flow of plate current is cut off or reduced to a level below that needed to work the relay 41 and the magnet 42. When the C battery is taken off the grid by the breaking of contact of the hairspring 21 with the pin 34, plate current is increased and the armatures of 41 and 42 are drawn up in step with the vibrations of the x balance. The screw 35 is adjusted until the clicks of the relay 41 are of the same length, that is the make is equally long with the break. The method is the same in principle as putting a clock in beat. An A battery 46 heats the filament of the triode 39 and is connected to a grid leak 45 of suitable resistance as shown.

The x balance is kept in vibration during the test by a source of compressed air 47 having an outlet pipe 48 connected thereto by a small opening or bleed hole, the pipe 48 constituting a small reservoir or storage capacity. A valve 49 opens the pipe 48 to a nozzle 48' directed tangent to the balance 19 so as to direct a puff of air thereon at each vibration and thus keep the balance in vibration. During the time the valve 49 is closed, air accumulates in the pipe 48 through the bleed hole until it reaches the pressure of the air in the tank 47. When the valve 49 is opened the air in the pipe 48 is suddenly released through the nozzle 48' and the ensuing puff of air on the rim of the balance, given in the direction the balance is turning at that instant, gives the balance an impulse thus keeping it in vibration. As soon as the valve 49 is closed air starts to accumulate for the next impulse.

The valve 49 is operated by a handle 50 connected by a link 51 to an armature 52 operated by the magnet 42 previously described. A spring 53 holds the armature to a stop 54 and a stop 55 limits motion in the other direction. Thus the balance will get an impulse each time the magnet 42 is operated, or each time the balance vibrates.

It is desirable to transform the impulses of the x balance and those of the standard clock into short impulses of the same frequency. To this end I have provided the armature 13 of the relay 12 with the condenser circuit previously described which gives a short pulse of current through the relay 59 at each beat of the standard clock. Similarly, I have provided the relay 41 with an armature 56 held to the back contact by a spring 57 in which position a condenser 58 is charged to the potential of the battery 16. When the armature 56 is drawn to its front contact a pulse of condenser discharge goes through a relay 78 which momentarily draws armature 79 and 79' to their front contacts against springs 80 and 80' holding them to their backstops 81 and 81' thus closing a circuit presently to be described.

The relay 59 has an armature 60 held by a spring 61 to its back contact, in which position a battery 62 charges through a high resistance 63 a condenser 64 of large capacity. When the armature 60 is drawn to its front contact the condenser is suddenly discharged. The capacity of the condenser 64, the potential of the battery 62 and the value of the resistance 63 are so proportioned that, between successive standard currents, the condenser potential grows to about half that of the battery 62 before the condenser 64 is discharged. To this end the resistance 63 may conveniently be made adjustable in a trial set up. The condenser circuit just described gives a measure of time, since the potential of the condenser at any instant is a function of the time since a standard current energized the relay 59.

To observe the potential of the condenser 64 at any instant, or when an x current energizes the relay 78 I have provided a detector condenser 65 of smaller capacity than the condenser 64 and have arranged to have the armature 79 momentarily connect 65 with 64 as shown, thereby bringing 65 to the instantaneous potential of 64 at the instant of connection. This potential will be a measure of the time elapsed between a standard and the next succeeding x impulse. If the potential of 65 remains constant through several impulses, it indicates that this time is constant, that is that the standard and x impulses have the same frequency. If this potential changes as successive currents occur its direction will indicate the direction of the change of phase between the standard and x impulses and the handle 30 and screw 35 are moved accordingly to change the length of the hairspring 21.

To detect the potential of the condenser 65 one may use an electrostatic voltmeter 70. Alternatively I prefer to use the triode circuit shown. This consists of a triode 66 having the condenser potential put on the grid and the plate current let through a galvanometer 71. The triode 66 has an A battery 68, a B battery 69 and a grid leak 67 connected as shown. The grid leak 67 will discharge the condenser 65 therefore it is to be made of resistance high enough to insure that the potential of the condenser 65 will fall but a small amount between successive charges of the condenser 65 from 64.

The galvanometer 71 is provided with an index hand 72. A gage hand 73 is frictionally mounted in the cover glass concentric with 72, the hand 73 has three prongs 74, 75 and 76. The prong 74 is set over the hand 72 at the beginning of a test, departure of 72 beyond the limits marked by 75 or 76 in a given number of seconds is an indication that the x balance is not closely enough timed to the standard.

It is to be noted that the indications of the method herein described are those of a null method and therefore independent of variations in the resistance of the contacts, electromotive force of the batteries and other variables of the circuits. What is observed is that the galvanometer 70 or 71, as the case may be, give the same indication for a given number of standard currents. One is not concerned in the absolute value of these indications.

In Fig. 2 is shown an alternative method of periodically testing the potential to which the condenser 64 has been charged. The potential of a condenser is the product of the charge and the capacity, hence if one measures the quantity at any time, that is the quantity of electricity, one may deduce the potential therefrom. To make this measurement I have the $x$ currents, when they occur, discharge the condenser through a ballistic galvanometer of long period. The successive discharges each half second hold the needle to a deflection which is a measure of the potential of the condenser at the time of discharge. The method will be readily understood by reference to Fig. 2 in which relays 59 and 78 are those of the same numbers in Fig. 1. As before, the relay 59 charges the condenser 64 through a high resistance 63 which is preferably adjustable. However in the instant circuit, the relay 78 when actuated by an $x$ current opens the charging circuit and discharges the condenser 64 through a ballistic galvanometer 82. A steady deflection of the galvanometer indicates synchronism, a rising deflection that the $x$ balance is slow and a falling one that the $x$ balance is fast.

In general, after the condenser 64 has been discharged by the relay 78, it will start to charge again when the armature 79 returns to its back contact. However this charge is of no effect since the condenser 64 is discharged when the armature 60 is drawn up. When the armature 60 returns to its back stop the cycle starts all over again.

It is to be noted that in the above described circuit there will be a period of no indicated potential during the time the relay armature 60 leaves its back stop in response to a standard current until it returns thereto. If an $x$ current happens during this interval there will be no indication. However in such a case one has only to wait a few seconds. If the $x$ and standard impulses are in synchronism the condition of no indication will persist and thus give an indication of synchronism. If the $x$ and standard impulses are not in synchronism, in more or less time the impulses will start to overlap and the appropriate indication will be had.

Many other changes and modifications may be made in the precise apparatus herein described without departing from the scope of my invention, for instance the standard and $x$ impulses may be interchanged, the $x$ impulses being sed to build up the potential and the standard impulses to detect the same. Having described my invention I claim:—

1. In combination, a source of electrical impulses of unknown frequency, a source of standard electrical impulses of approximately the same frequency, means controlled by said impulses of unknown frequency to produce relatively short impulses of the same frequency as said unknown frequency, and means continuously responsive to a change in the phase difference between said standard impulses and said short impulses, whereby said phase difference between said standard impulses and said short impulses may be continuously observed.

2. In combination, a source of electrical impulses of unknown frequency, a source of standard electrical impulses of approximately the same frequency, means controlled by said impulses of unknown frequency to produce relatively short impulses of the same frequency as said unknown frequency, and means including a condenser continuously responsive to a change in the phase difference between said standard impulses and said short impulses, whereby the phase difference between said standard impulses and said short impulses may be continuously observed.

3. In combination, a source of periodic electric impulses of unknown period, a source of standard periodic impulses of approximately the same period, a condenser, means for charging said condenser at a predetermined rate, means controlled by said standard impulses for periodically discharging said condenser, and means governed by said impulses of unknown period to indicate the amount of charge on said condenser at the instant of each impulse, whereby the progressive difference in charge is an indication the progressive change of phase between said standard impulses and said impulses of unknown period.

4. In combination, a source of periodic electrical impulses of unknown frequency, a source of standard periodic electrical impulses, a condenser, means for charging said condenser at a predetermined rate, means governed by said standard impulses for periodically discharging said condenser, a second condenser, means governed by said impulses of unknown frequency to periodically connect said condensers, and an indicator to observe the charge on said second condenser, whereby the progressive change in the phase between said standard and said unknown impulses may be observed.

5. In combination, a source of standard electrical impulses, a source of electrical impulses of unknown period, a condenser, means for charging said condenser at a predetermined rate means controlled by said standard impulses for periodically discharging said condenser, a second condenser, means controlled by said impulses of unknown period for periodically connecting said condensers, a triode having a grid circuit including said second condenser and a plate circuit including an indicator whereby the difference in phase of said standard and said unknown impulses may be inferred.

ARTHUR F. POOLE.